United States Patent [19]

Oosterkamp

[11] 4,127,006
[45] Nov. 28, 1978

[54] METHOD AND EQUIPMENT FOR INSTALLING MARINE PIPELINES TO EXTREMELY GREAT WATER DEPTH

[76] Inventor: Johannes F. Oosterkamp, Kolgansstraat 18, Strijen, Zuid, Netherlands

[21] Appl. No.: 670,872

[22] Filed: Mar. 26, 1976

[30] Foreign Application Priority Data

Oct. 3, 1975 [NL] Netherlands .................... 7511638

[51] Int. Cl.² .............................................. F16L 1/04
[52] U.S. Cl. .................................................. 405/171
[58] Field of Search ................ 61/72.3, 112, 105, 107, 61/108, 109; 254/134.3 SC

[56] References Cited

U.S. PATENT DOCUMENTS

| 3,214,921 | 11/1965 | Gorfert et al. | 61/112 |
| 3,566,609 | 3/1971 | Smith | 61/72.3 |
| 3,620,028 | 11/1971 | Wilde | 61/112 |
| 3,640,080 | 2/1972 | Neal | 61/72.3 |
| 3,765,184 | 10/1973 | Menard | 61/72.3 |
| 3,765,185 | 10/1973 | Peck et al. | 61/109 |
| 3,835,707 | 9/1974 | Rosa et al. | 61/72.3 |
| 3,844,129 | 10/1974 | Finlay | 61/72.3 |
| 3,849,997 | 11/1974 | Gower | 61/72.3 |
| 4,015,435 | 4/1977 | Shaw | 61/108 |

Primary Examiner—Mervin Stein
Assistant Examiner—Alex Grosz

[57] ABSTRACT

A new and improved apparatus for installing marine pipelines in a body of water and the method of using the same including multiple support units having buoyancy tanks and roller-tensioner means for operatively securing the support units to the pipeline submerged in the water at spaced intervals along the pipeline to control the pipeline configuration between a laying vessel and the bottom of the body of water. The support units include control means which is preset or has a remote controller operable from the laying vessel to adjust the buoyancy of the buoyancy tanks and the tension on the tensioner means to control the position of the support units on the pipeline and the amount of lifting force to the pipeline.

3 Claims, 7 Drawing Figures

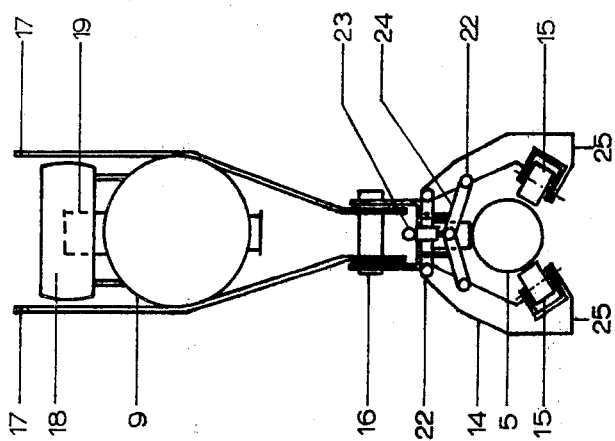
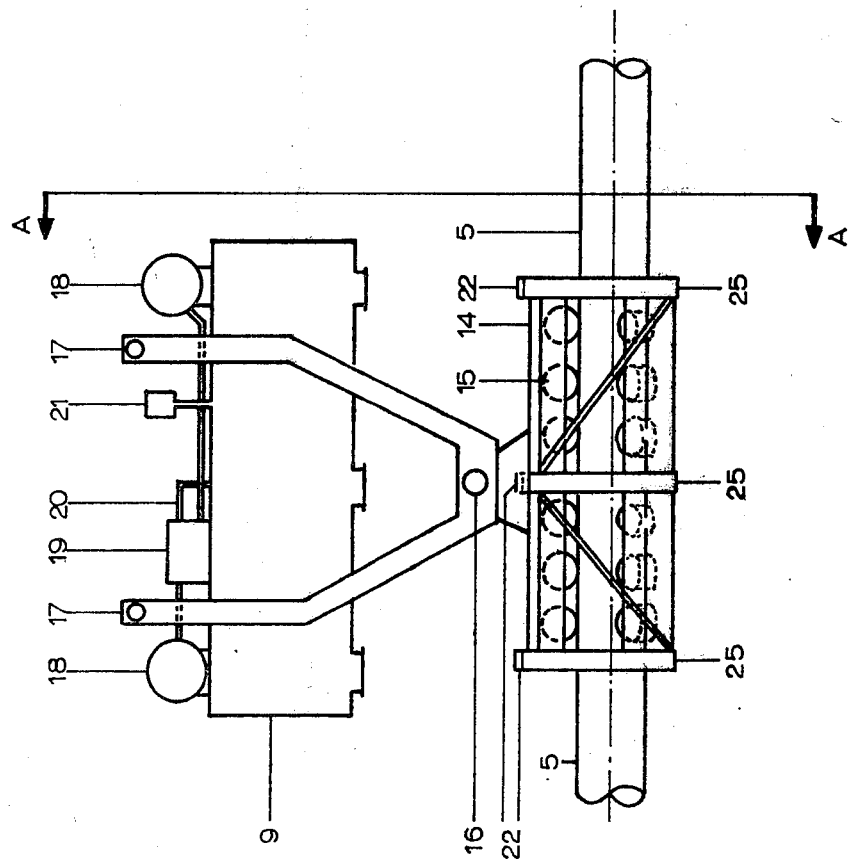

METHOD AND EQUIPMENT FOR INSTALLING MARINE PIPELINES TO EXTREMELY GREAT WATER DEPTH

In the methods of laying marine pipelines used to date, the configuration of the unsupported part of the pipeline is controlled by the length and shape of the stinger or pipe support ramp, which is part of the pipe layvessel, and the tension applied to the pipeline by the layvessel's tensioning equipment.

Disadvantages of this method are for instance,

The tension applied to the pipeline is introduced by a tension unit which grips around the pipe. This can cause damage to the pipeline or its weight coating, which is of vital importance for the installed pipeline.

The stinger or pipe support ramp which is normally used to support the pipeline after leaving the layvessel's workdeck is a very delicate part of the pipelay equipment, which is easily damaged during the pipe laying operation, and which decreases the maneuverability of the layvessel. Very often damaging the stinger may cause damage to the pipeline, causing loss of time and very costly repairs.

In case of weather conditions approaching the limits of workable weather, the pipeline must be abandoned by lowering it to the bottom of the water using a steel cable connected to the capped end of the pipeline. The steel cable obviously does not have the same characteristics as the pipeline and therefore this operation is very dangerous.

The recognised limit of water depth in which a pipeline can be installed to date is governed by the dimensions of the subject pipeline, its submerged weight, the length of the stinger and its configuration, and the capacity of the tension unit of the pipe laying vessel.

The principal object of the invention is to provide a method for installing marine pipelines which extends the water depth limitation far beyond the presently accepted, without the use of gigantic stinger constructions, and to eliminate the problems of the method commonly used to date as described above.

The novel method is based on the principle that a multi supported construction is subject to less tension and stress than the same construction supported in two locations only, in which case the construction itself must be sufficiently rigid to maintain the original configuration with or without the application of a tension force.

In order to provide underwater supports, the fact that the pressure at a certain water depth is directly related to the is used as a key factor to control the underwater support.

Based on the two above mentioned principles it is possible to position supports underwater along the ideal configuration of the pipeline. These supports serve a dual function.

Firstly the supports can dictate the configuration of the pipeline irrespective of the tension applied to the line by the pipe laying vessel's tensioning unit. Secondly the forces accumulated in the unsupported part of the pipeline which are the result of the pipeline's submerged weight, can be absorbed by the underwater support unit, and be transferred to the surrounding water.

Since each support unit will maintain a set water depth, it serves as a fixed support for the pipeline, travelling along the line at a constant distance to both the water surface and laying vessel, while balancing the accumulated forces of the line with the support unit's buoyancy.

Another object of the invention is to increase control of the pipeline during the laying operation. By using the novel method the pipeline can be constantly and positively controlled irrespective of water depth pipeline dimensions of the pipelay vessel's tensioner and/or anchor system capacity. Furthermore, control of the pipeline becomes more reliable since the controlling stations are decentralized and each support unit allows fine adjustment to be made in order to maintain the ideal pipeline configuration.

A further object of the invention is to reduce the maximum tension in the pipeline. Because each support unit will collect the forces accumulated in the pipeline section it is controlling, and convey these forces to the buoyancy tank of the support unit such that the maximum tension occurring in the pipeline during any period of the laying operation will be considerably less than normal by using the existing methods. This results in a considerably lower capacity required for the pipe laying vessel's tensioner which in turn includes that the anchoring system of the pipe layvessel, only transferring the tensioner's reaction force to the anchors of the vessel, can be of substantially less capacity. Under certain circumstances this can include that the anchoring system of the laying vessel is not required, and in this case the pipe layvessel can be of the self propelled type, and subsequently the feasable speed of laying pipe is no longer dependent of the laying vessel's support crafts.

A still further object of the novel method is to install marine pipelines in extreme water depth from relatively small pipe laying vessels. A short pipe support ramp attached to the stern of the vessel will primarily function as the mounting ramp for the underwater pipe supports.

Another further object of the novel method is to increase the safety of pipeline laying equipment and workcrew during the pipe, abandonment procedure. By using the underwater pipe supports, the abandonment procedure can be changed to a parking procedure. This parking procedure consists in short of capping of the pipeline, lowering the end of the line beyond the pipeline support ramp by using a steel wire cable, and just before leaving the ramp an underwater support unit is mounted around the pipe end. Now the water depth for all underwater support units is adjusted so that the entire pipeline will be lowered to a water depth where the bad weather and subsequent bad state of the sea can not influence the pipeline, while the ideal pipeline configuration is maintained. Once the pipeline has assumed this position, all tensioner units of the underwater supports are blocked so that the support units can no longer travel along the pipeline. The last support unit, floating closest to the watersurface, is anchored, and all connections with the pipe laying vessel can be released. The parked pipeline is marked as required and the laying vessel can find a safe area to ride out the bad weather. This procedure eliminates the lowering of the pipeline to the bottom of the water, and therefore is a lot faster and safer. Also recovering the pipeline is a fast procedure and does not require the aid of a steel wire rope, and the water depth from which the pipeline must be recovered is very small.

A still further object of the invention is to outline the underwater pipeline support unit required to carry out the novel method of laying marine pipelines. Such underwater support unit basically consists of two parts, one is the floater or buoyancy tank and the other is the tensioner.

A preferred and practical embodiment of the invention is shown in the accompanying drawings in which:

FIGS. 5A–5B and 6 show views of the under water pipe support unit necessary to install pipelines according to the invention.

DESCRIPTION OF THE PREFERRED EMBODIMENT

Figure 1:
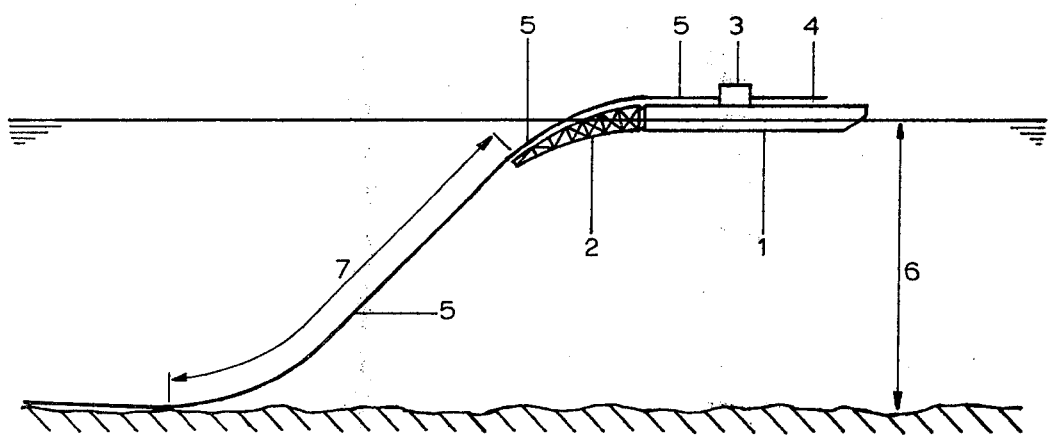
FIGS. 1 and 2 are schematics explaining the presently used method of laying pipelines.

FIG. 1 schematically indicates the equipment required in the process of installing marine pipelines according to a well known and commonly accepted method.

At the stern of the pipe laying vessel 1 a stinger or pipe support ramp 2 is attached, a pipe tensioning unit 3 is mounted on the pipe layvessel, the end of the pipeline to which pipe joints are welded is indicated with 4. The supported part of the pipeline 5 becomes unsupported beyond the end of the stinger 2. The unsupported part of the pipeline is indicated with 7. The maximum water depth (the distance from water bottom water surface) is indicated with 6. For reason of clarity the supply ships, pipe laying vessel's anchor system, and the special vessels to bring out these anchors, are not included in FIG. 1. These items however do form an integrated part of the pipe laying method as schematically presented in FIG. 1.

The pipe laying procedure is as follows; The pipe layvessel is anchored over the predetermined pipeline route. On the workdeck of the layvessel the pipeline is composed of pipe joints, and fed through the pipe tensioning unit, which holds the pipeline already welded up. The pipeline then is transported over the pipe support ramp or stinger and lowered into the water. The object of the tensioning unit is to introduce a pulling force to the pipeline, so that the lowering is kept under control, and the unsupported part of the pipeline is held as close as possible to a predetermined configuration, which must ensure that the accumulated forces and stresses in the pipeline are within the range of the allowable without causing damage to the pipeline. As the laying of the pipeline proceeds the layvessel pulls itself along the pipeline route using the anchoring system to control the position of the vessel, and to provide a counter force for the tensioning unit's reaction force. When the vessel 1 has arrived too close to an anchor, this anchor is brought out by a special vessel.

The configuration and length of the stinger 2 are dictated by the particulars of the pipeline being installed and the maximum water depth 6. The main function of the stinger is to ease the change of the horizontal part of the pipeline into the unsupported part 7. The main function of the tensioning unit 3 is to hold the pipeline back so that the unsupported part of the line 7 assumes a configuration which will prevent the line to buckle.

Figure 2:
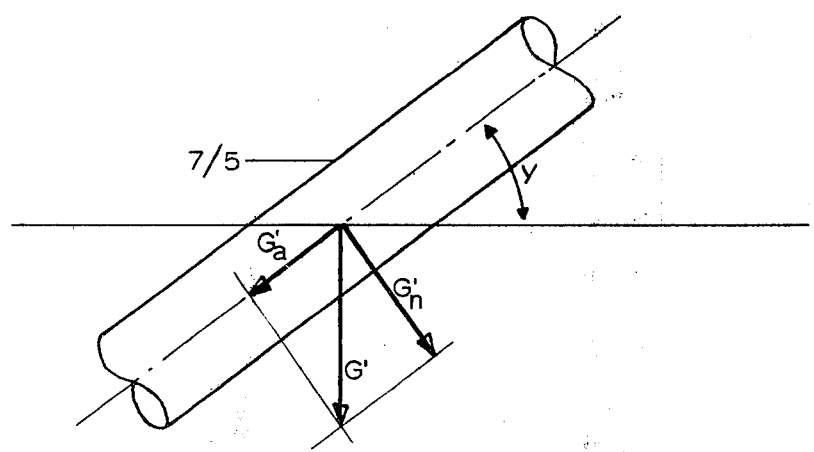

FIG. 2 shows schematically a vector analysis of a part of the unsupported pipeline 7. From FIG. 1 it is obvious that the angle of descent changes along the unsupported pipeline 7, and should be taken into account. However since this Figure only wants to explain the basic type of forces to which the pipe is subject, the angle of descent is not taken into account to quantify the forces. The submerged weight of the pipeline section is shown as $G'$, which can be split up in two components. One component $G'_a$, parallel with the axis of the pipeline, and one component perpendicular to the axis of the pipeline $G'_n$. The axial component resembles the tension force, and the perpendicular component resembles the shear force to which the pipeline is subject. The angle Y is the angle of descent, measured as the angle between the axis of the pipeline and the horizontal plane. The limits for the angle Y are directly related with the pipeline particulars, the maximum water depth and the capacity of the pipe laying equipment.

From FIG. 2 it is obvious that the capacity of the tensioning unit must at least equal the sum of all tension forces $G'_a$, in order to maintain a balance of forces. Also the maximum water depth 6 is proportional to the length of the unsupported pipeline 7. Configuration and length of the stinger 2 dictate the maximum angle Y and, as there is a relation between Y and the axial force $G'_a$, the maximum value of force $G'_a$. In case Y is increased, $G'_a$ will increase, in which case the tension in the pipeline and the maximum tension introduced to the pipeline in total, will increase as well. In case the angle Y is chosen less steep, $G'_n$ will increase, which can bring this force up to the limit where it can cause the pipeline to buckle.

Concluding it can be said that in case pipelines are installed in deep water, the angle Y must be increased in order to keep the accumulating shear forces within the limits set by the pipeline and its mechanical properties. Raising the angle Y therefore is not always possible. Alternatively, the assembling of the pipe joints could be done at a certain angle, but this will create pipe handling and welding problems which will most likely slow down the overall performance of a pipe laying vessel.

Figure 3:
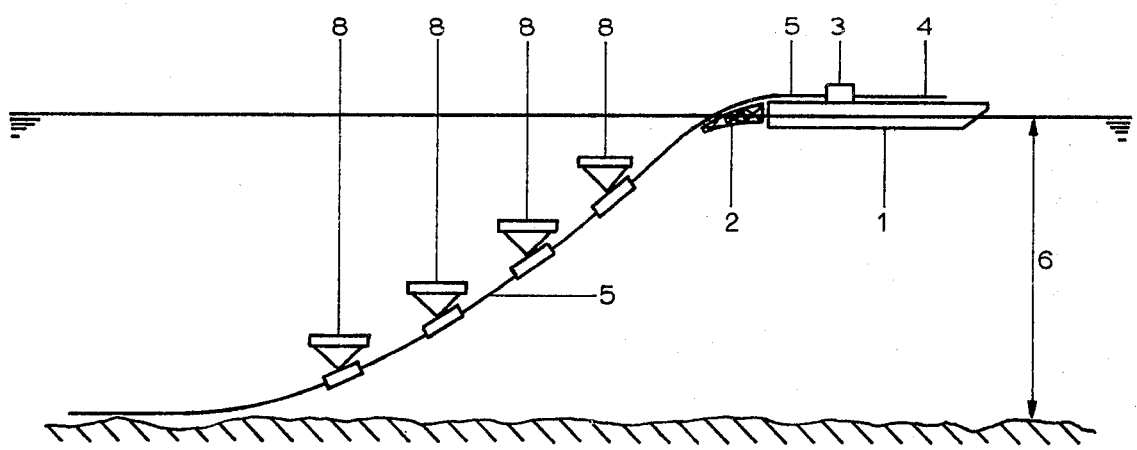
FIGS. 3 and 4 are corresponding schematics to clarify the novel method.

FIG. 3 shows the equipment required to lay marine pipelines according the method invented. The pipe laying vessel 1 is equipped with the regular type of machines and tools to assemble the line from pipe joints in a horizontal plane. At the stern of the laying vessel 1 a short pipe support 2 is connected. This stinger serves as a work platform for installing the underwater pipe supports around the pipeline. On the layvessel a conventional tensioning unit is installed. This unit is of very small capacity and subsequently applies a relatively small tension force to the pipeline. Assembling the line from pipe joints is done in the area before the tensioning unit, indicated with 4.

The underwater part of the pipeline 5 is now divided into a number of supported sections, each section ending at underwater support units 8. The result is that the unsupported length of the pipeline 7 is reduced to a fraction of the length were the conventional method of laying pipelines used. See FIG. 1. In FIG. 3 only three such sections are shown to give a clear schematic.

The configuration of the underwater pipeline required to achieve maximum safety regarding the stresses in both pipeline and laying equipment, are determined on the basis of engineering calculations. Depending for instance on the available laying equipment and the dimensions of the subject pipeline, the maximum water depth anticipated, and other factors, the minimum number and minimum required capacity of the underwater pipe supports is determined. The result of these calculations can later be used as basic parameters for the support units, and the tension and water depth in particular are fed into the regulating system of each support unit individually. Feed in of this type of information can be done prior to connecting the support unit to the pipeline, or through a remote control system. Each support unit 8 functions as a supporting point for the underwater pipe line 7, collects the accumulated forces from the line and transfers these forces to the surrounding water.

Figure 4:
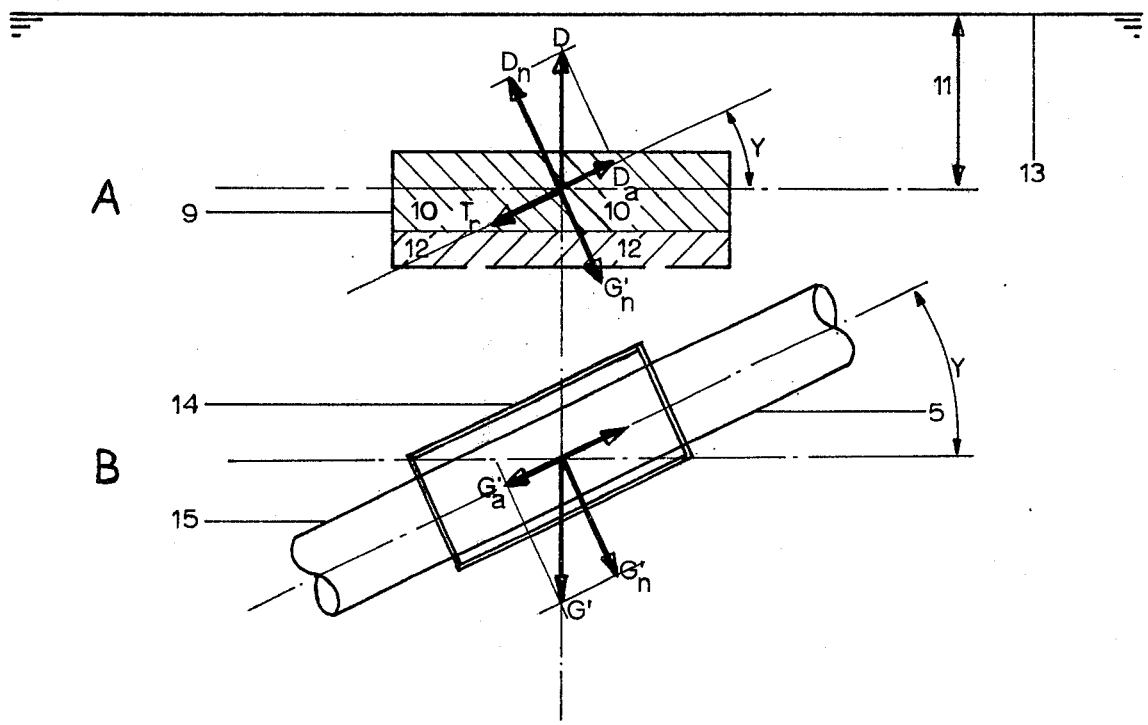

FIG. 4 schematically indicates the forces collected by the underwater support unit.

FIG. 4A indicates the buoyancy tank part of the support unit. It consists of the buoyancy tank 9 which is filled with a volume of buoyant medium 10. Any medium which is stable in water, does not chemically react with the water, and has a specific gravity lower than water, can serve as the buoyant medium.

Through the water inlet and outlet of the buoyancy tank, the surrounding water will take up the remaining volume 12 of the buoyancy tank. Due to the buoyant medium the tank now produces an upward force D. This force is proportional with the volume 10.

FIG. 4B shows the tensioner part of the support unit. The tensioner 14 can develop a force parallel with the axis of the unit. Since the tensioner is mounted around the pipeline, its axis is parallel with the axis of the pipeline. The forces accumulating in the pipeline are a result of the submerged weight of the line, which is indicated with G'. This force can be split in two components, the axial component $G'_a$ and the perpendicular component $G'_n$. The tension force T as developed by the tensioner 14 now must equal $G'_a$ and be directed opposite to obtain a balance of forces. The perpendicular component $G'_n$ can not be eliminated by a force from the tensioner, but through the connection of the tensioner with the buoyancy tank this force $G'_n$ is transferred to the buoyancy tank 9. The tension T will cause a reaction force $T_r$. The buoyancy D can be split in $D_a$ and $D_n$, as indicated, and now a balance of forces can be achieved by adjusting T and D so that the components eliminate each other. As long as no balance of forces is obtained, the difference in forces will cause the buoyancy tank, and the attached tensioner holding the pipeline section, will either move towards or away from the water surface, depending upon which force exceeds the balance. This movement up or down of the support unit will bring the unit in surrounding water with a different pressure. The pressure sensor and the regulating system will in turn establish this difference of pressure in the surrounding water compared with the required pressure, and subsequently add or bleed off buoyant medium from the tank 9, until the pressure sensing system senses that the preset pressure and the pressure of the surrounding water are the same. This is only achieved at the predetermined water depth applicable for the particular support unit. Since the pipeline configuration and the required parameters for each support unit are determined in the engineering phase, the forces $G'_a$ and $G'_n$ can be calculated in relation to the position of each support unit along the pipeline, which will apply to a certain water depth for each support unit, and govern the required buoyancy D.

Depending upon the maximum water depth and the pipeline dimensions, the optimum number of support units can be established regarding the anticipated forces in the entire system. In case the water, depth varies considerably along the pipeline route, the calculations can be made for several phases with minor water depth variation, and the optimum number of support units can be established for each phase.

In the event that an additional support is required, all installed units can be moved along the pipeline, simultaneously or step by step, and the additional unit is then mounted around the pipeline at the laying vessel's ramp. This procedure requires adjustment of the tensioner and the pressure sensor of each support unit, to the required settings applicable to the new location along the pipeline. By following this procedure the number of sections of the underwater pipeline is increased by one.

In case the laying operation is approaching an area where the water depth decreases, two basic procedures can be followed. Firstly the distance between the support units can be reduced whilst maintaining the number of underwater supports. This requires adjustment of the tensioner and pressure sensor's setting secondly, an underwater support unit can be removed from the pipeline, and the actual procedure for entering deeper water is reversed.

To remove a support unit the tensioner is hydraulically opened, and the pressure sensing device is set at barometric pressure. This causes the regulating system to add buoyant medium to the tank 9 until the water surface is reached.

FIG. 5A shows a typical side view of the underwater support unit. FIG. 5B shows same unit in front view.

The tensioner 14 is mounted around the pipeline 5. The tensioner can by means of a wheel or track construction 15 roll along the pipeline 5, at an adjustable resistance. The tensioner 14 is connected with the buoyancy tank 9 by means of a pivoting construction 16. The buoyancy tank 9 is equipped with lifting lugs 17 which serve as a connection point for lifting, or to connect the underwater support units to each other. The buoyant medium can be stored in tanks 18 on the buyoancy tank or in its vicinity. Supply of the buoyant medium to the tank 9 is controlled by the pressure sensing system which commands the buoyancy regulating system 19. Depending on the pressure difference between the set pressure and the established actual pressure of the surrounding water, the sensing system 19 commands the regulating system to either supply buoyant medium to the tank 9 by opening the valve in the supply line 20, or by bleeding off buoyant medium by opening the bleed off line 21. In both cases the volume of buoyant medium is changed to make the support unit assume the water depth as set by the commanded pressure.

The tensioning unit is constructed so that it can open in two halves, by actuating a pivoting construction 22. This opening and closing of the tensioning unit facilitates the installation and removal of the support unit from the pipeline. The pivot mechanism can be operated by remote control, so that at all water depth the support unit can be removed from the pipeline 5, without the assistance of divers. The pivot mechanism can be dimensioned so that at the end of the opening stroke of the cylinder 23 the pivoting arms 24 contact the pipeline 5 and push the tensioning unit away from the line 5. After opening the tensioner and setting the pressure sensor to barometric pressure, the tensioning unit with the related construction of the support unit will float to the surface of the water.

Figure 6:
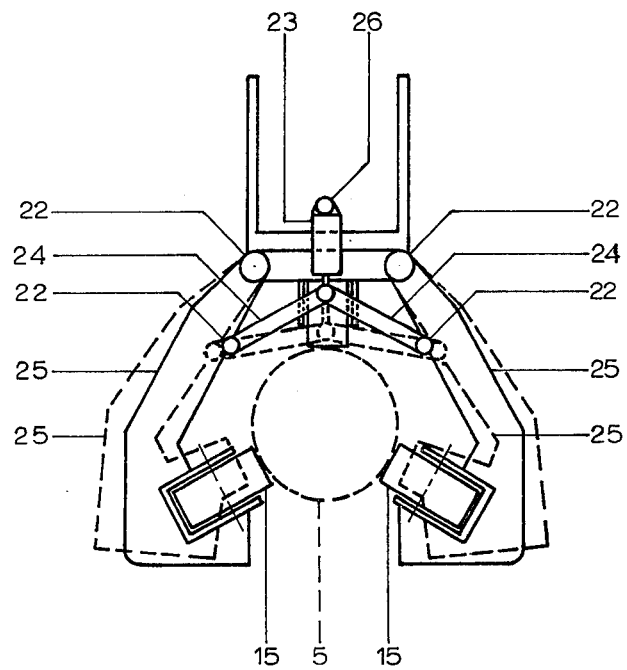

FIG. 6 shows a typical pivot construction of the tensioner. It consists of 2 pivot rods 22 which connect to the main structure of the two tensioner halves. To operate the mechanism, and in order to maintain the required pressure of the wheels or tracks with the pipeline 5, a for instance hydraulically operated cylinder 26 is connected to the central pivot of the two rods 22. By operating the cylinder 26 from the retracted to the extended position, the pivot rods 24 will move in such way that the tensioner halves are moved away from the pipeline 5 and the final gap will allow the tensioner to be removed from the pipeline. By retracting the cylinder 26 the contact pressure of the tensioner wheels or tracks 15 on the pipeline 5 can be increased. By adjusting the retracted position of the cylinder the contact pressure can be set at an optimal rate for a particular pipe laying operation. The power source for the hydraulic cylinder 26 can be the same as used for the tensioner, or alternatively, the pressure of the buoyant medium supply can be used in an air over hydraulic system. Control of the tensioner opening and pressure adjustment is done similar to the control of the pressure sensors setting i.e. by remote or wireless control system.

The method part of this invention consists of a novel method to for installing marine pipe lines, and the outline of the equipment required to execute the novel method.

The method basically works on the principle that the stresses accumulating in the underwater pipeline are transferred to the surrounding water at certain stations along the pipeline, instead of letting these stresses build up in the pipeline all the way up to the laying vessel, and transferring the stresses through the layvessel's tensioning unit and anchoring equipment to the bottom of the water. By supporting the pipeline underwater in certain locations, and eliminating the accumulated stresses by transferring them to the water, the stresses in the pipeline will be of a more evenly divided character, and the maximum stress is kept to a fraction of the conventionally experienced. The key to successful control of the under water part of the pipeline is that the support units attached to the line will maintain a commanded water depth irrespective of the forces collected from the pipeline, since the system which enables the support units to maintain this set water depth works on the basis of the pressure present at such water depth.

The underwater support units necessary to successfully carry out the novel method consist of a part maintaining a predetermined water depth by varying the buoyancy of the unit, and a part which travels along the pipeline and collects the stresses from the line. Both parts are connected to each other by a swivel construction.

The part travelling along the pipeline is an underwater tension unit, possibly similar to the unit as patented by Western Gear Corp. in 1972, registered in the Dutch Patent Office under number 7201827, but in this case the tensioning unit is especially used underwater, and possibly the tension applied by the unit is porportioned by the pressure in the buoyancy tank of the support unit. Another basic difference is that in the application of the tensioning unit according the novel method, the reaction forces of the tensioning unit are transferred underwater to a buoyancy tank, and eliminated by the buoyancy of that tank.

The essential and unique feature of this buoyancy tank is the capability to maintain a set water depth, irrespective of the forces applied to the tank. This capability is obtained through a pressure sensitive regulating system which very accurately senses any variation between the preset pressure and the existing pressure in the surrounding water. Since a certain pressure is typical for a specific water depth, variation in pressure implies a variation in water depth.

The pressure sensing unit commands the buoyancy control system automatically and according to the type of variation sensed.

The buoyancy tank construction is such that the effective volume taken up by the buoyant medium can be adjusted as required.

This is achieved by providing the tank with a supply and a bleed off line for the buoyant medium, and a water inlet and outlet. The supply and bleed off lines are connected with the top of the tank and the water inlet and outlet are located at the bottom of the tank. The buoyant medium can be stored in pressurized form in containers connected to the support unit, or supplied through a connection with the pipe laying vessel.

The support unit maintains a certain water level as follows: As soon as the pressure of the surrounding water varies from the pressure set in the sensing unit, this variation is noticed. In case the pressure of the surrounding water is higher than the pressure set, this means that the support unit is at a deeper water level than required. The sensing system commands the buoyancy regulating system to add buoyant medium to the tank. Subsequently water is forced out of the tank, and the buoyancy of the support unit is increased. As a result the unit tends to float towards the surface of the water. When the water level corresponding with the set pressure is reached, the sensor stops the command to increase the buoyancy capacity of the support unit.

In case the pressure in the surrounding water is lower than the pressure set in the sensor, this means that the unit is at a water level less deep than required. The pressure sensing unit subsequently commands to open the buoyancy tank bleed off to reduce the buoyancy so that the entire unit will sink to a deeper water level. The sinking will continue until the pressure sensor finds the set pressure and the pressure of the surrounding water are equal. This means the unit is at the required level. In this manner the buoyancy tank and the entire underwater support unit will maintain a predetermined water depth, irrespective of the capacity of the buoyancy or the forces to be eliminated.

The tension applied to the pipeline by the tensioner can be calculated in the engineering stage of the pipe laying project. This will be governed by the choice of pipeline configuration and applicable water depth, apart from possible other factors. Regarding the depth fluctuations which can occur, it can be advantageous to make the applied tension proportional with the pressure differential as measured by the sensing unit of the regulating system. The relation between pressure differential and applied tension must be such that in case of pressure increase in the surrounding water the tension will decrease, and in case the pressure in the surrounding water decreases the tension is increased. This tension variation as compensating factor for pressure variations can, depending the specific circumstances and the size pipeline, and relative to the equipment involved, be a proportional or fractional relation with the pressure differentials as sensed.

In above described manner the entire underwater support unit moves along the pipeline at a set water depth, and applies a tension to the pipeline required to balance the stresses accumulated in the pipeline. Each support unit collects the stresses and forces from the pipeline and creates a balance by the buoyancy and tension force. Fluctuations of water depth are noted by the pressure sensors through a difference in pressure, and are corrected automatically by adjusting the buoyancy, either in relation with adjustment of the tension force or solely by change of buoyancy.

The support units are attached to the pipeline on the pipe layer. In case the water depth increases during the laying operation to such extent that an additional support unit is required, the installed units can by remote control be sent to greater water depth, and a unit can be added at the pipe laying vessel to maintain optimal pipeline span between the support units. During this operation the ideal pipeline configuration can be maintained.

To remove a support unit from the pipeline the tension unit can be opened by remote control or manually, so it is freed from the line. By setting the sensing unit pressure to the barometric pressure, the entire support will move to the water surface. When approaching a shore or platform end of the pipeline, the line can be lowered to the bottom of the water by lowering the support units simultaneously while maintaining the ideal pipeline configuration until the line is completely resting on the bottom of the water.

I claim:

1. A method for installing marine pipelines by assembling the pipeline on a laying vessel and gradually lowering the pipeline in the water, comprising the steps of:

attaching underwater buoyancy support units to the pipeline at spaced intervals with an adjustable resistance roller means for controlling the position of the support units on the pipeline;

controlling the rolling of the support units along the pipeline by varying the rolling resistance or tension of the roller means on the pipeline;

sensing the pressure of the surrounding water which represents a certain water depth;

maintaining the support units at a predetermined water depth by adjusting the buoyancy of the support units and the rolling resistance or tension of the roller means to maintain the desired pipeline configuration between the laying vessel and the bottom of the water such that the support units at least in part neutralize the pipeline stresses, said buoyancy of said support units being adjusted by sensing the water pressure in the surrounding water with deviations in the water pressure activating a buoyancytension regulating system that automatically brings the support unit back to the set level by adjusting the buoyancy and rolling resistance tension of the unit, said maintaining of said support units being accomplished by the following specific steps:

adjusting the position of each support unit along the pipeline by temporarily reducing the rolling resistance to allow the buoyancy of the unit to cause the unit to move upwardly to a new position;

adjusting the vertical position of the unit and thus of the pipeline by adjusting the buoyancy of each support unit without decreasing the rolling resistance to allow movement along the pipeline; and adjusting the position of the support unit along the pipeline and the vertical position of same by adjusting the rolling resistance in combination with changing the buoyancy of the unit.

2. An apparatus for installing marine pipelines by assembling the pipeline on a laying vessel and gradually lowering the pipeline into the water, including a plurality of underwater support units, each support unit adapted for attachment at spaced intervals along said pipeline in the water, comprising:

each of said support units including stress transfer means for transferring the forces acting on said pipeline away therefrom, said stress transfer means includes adjustable roller or tension means attachable to the pipeline and buoyance means attached to the adjustable roller means for controlling the pipeline configuration between the laying vessel and the bottom of the water;

said buoyancy means having pressure sensing means for maintaining a fixed distance to the water surface by sensing the pressure of the surrounding water which represents a certain water depth;

said adjustable roller means having a variable tensioner means for controlling the position of the support units along the pipeline by varying the rolling resistance of the rolling means;

said support units having control means for regulating the buoyancy of the buoyancy means;

each pressure sensing means including adjustable setting means for setting at a predetermined pressure at a desired water depth and for sensing the water pressure in the surrounding water and detecting variations from the desired water depth;

the control means having means for activating a buoyancy-tension regulating system in response to deviation from the pressure and thus changes in the water depth to automatically bring the support unit back to the desired water depth by adjusting the buoyancy and tension of the unit in response to the load forces applied to the support unit;

said variable tensioner means and control means cooperating to adjust the position of each support unit along the pipeline by temporarily reducing the rolling resistance to allow the buoyancy of the unit to cause the unit to move upwardly to a new position;

said variable tensioner means and control means further including means for adjusting the vertical position of the unit and thus of the pipeline by adjusting the buoyancy of each support unit without decreasing the rolling resistance to allow movement of the unit along the pipeline; and said variable tensioner means and control means cooperating to adjust the position of the support unit along the pipeline and the vertical position of said support unit by adjusting the rolling resistance in combination with adjusting the buoyancy of the unit.

3. The apparatus as set forth in claim 2 wherein:

the underwater support units include a buoyancy tank for containing a variable volume of buoyant medium;

the tensioner means being operatively connected with the tank for varying the tension force in response to variation in the pressure of the buoyant medium in the tank;

the buoyancy tank has a sensing system to sense pressure differences between the predetermined pressure and the actual pressure of the surrounding water;

a buoyancy relating system operatively connected with the sensor system to adjust the buoyancy to maintain a set pressure which corresponds to a certain water depth; and the buoyancy tank further has a buoyancy medium source and a bleed-off line for the buoyant medium and openings to allow the surrounding water to enter or leave the tank to adjust the buoyancy to meet the requirements and to ensure that the pressure of the buoyant medium equals the pressure of the water in the tank.

* * * * *